E. S. MUMMERT & J. O. DIXON.
FACING TOOL.
APPLICATION FILED JULY 15, 1915.

1,191,813.

Patented July 18, 1916.
2 SHEETS—SHEET 1.

WITNESSES:

INVENTORS
Ervin S. Mummert
and Joseph O. Dixon
BY
Arthur E. Zumpe
ATTORNEY

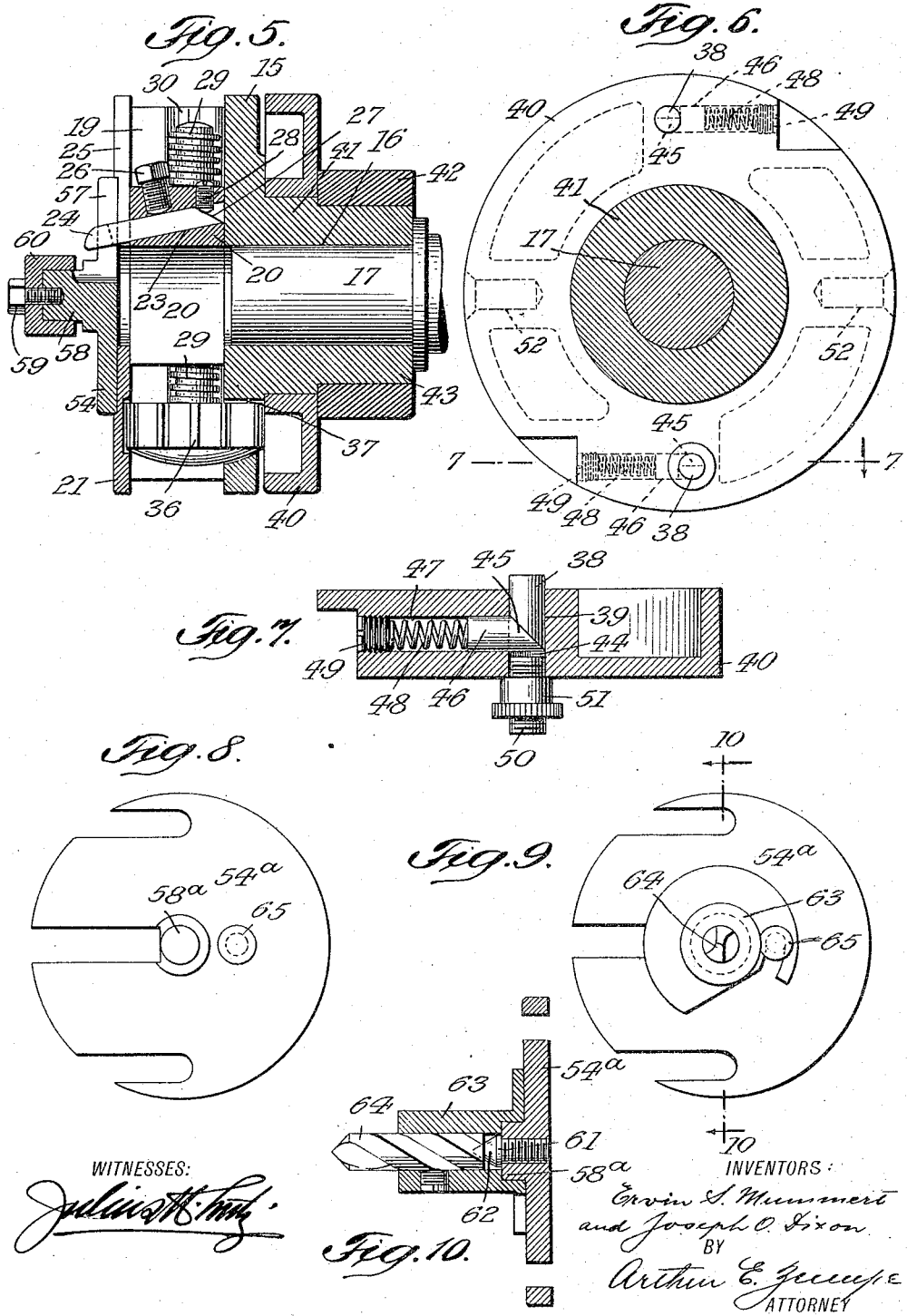

UNITED STATES PATENT OFFICE.

ERVIN S. MUMMERT AND JOSEPH O. DIXON, OF HANOVER, PENNSYLVANIA.

FACING-TOOL.

1,191,813.  Specification of Letters Patent.  Patented July 18, 1916.

Application filed July 15, 1915. Serial No. 39,942.

*To all whom it may concern:*

Be it known that we, ERVIN S. MUMMERT and JOSEPH O. DIXON, both citizens of the United States, and residing at Hanover, county of York, and State of Pennsylvania, have invented certain new and useful Improvements in Facing-Tools, of which the following is a specification.

This invention relates to a facing tool of novel construction and is more particularly adapted to be secured to the rotating spindles of lathes, drill presses, boring mills and similar machines.

The facing tool is self-feeding and is especially designed for facing stationary work pieces on the same principle on which such pieces are rotated in a lathe or turning mill to be subjected to the action of tool bits mounted in stationary tool holders.

Figure 1:
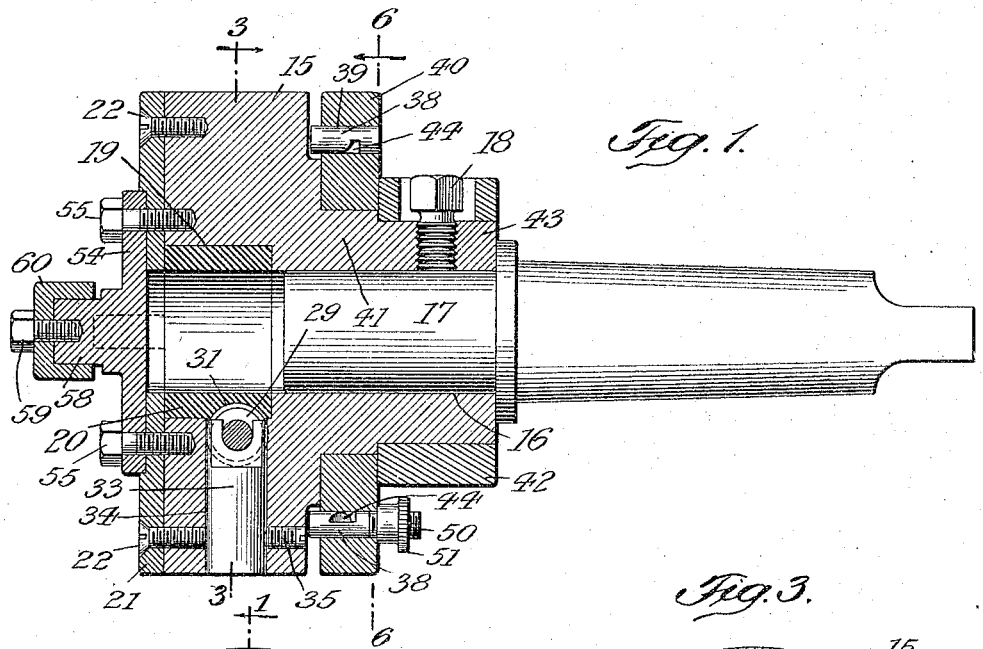
Figures 2, 3:
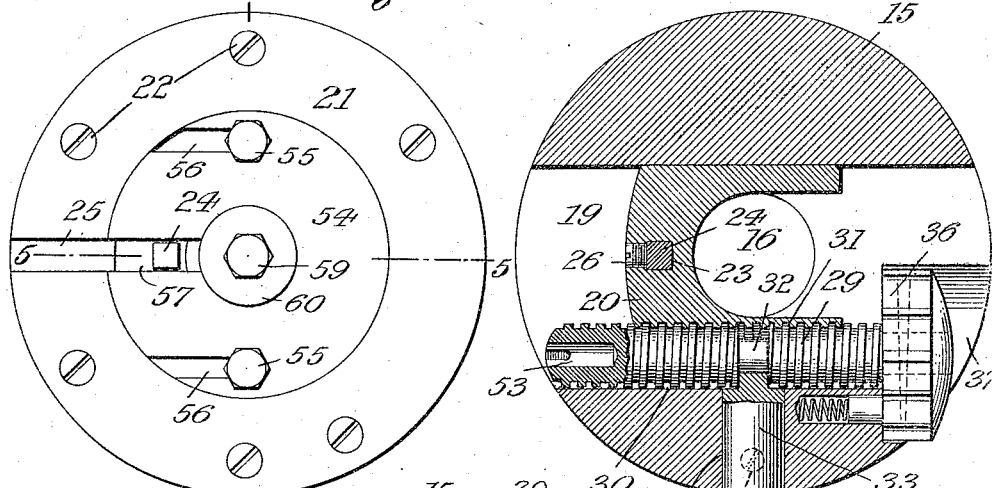
Figure 4:
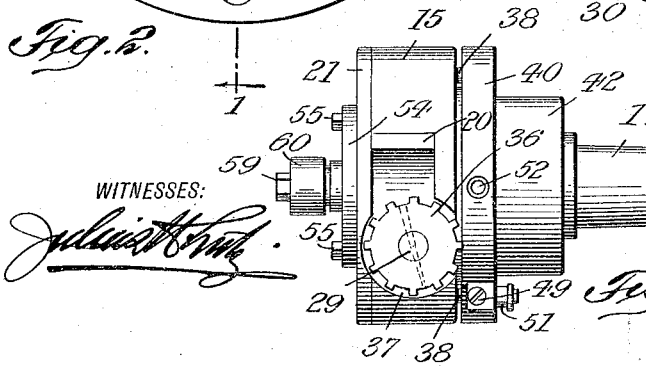

In the accompanying drawings, Figure 1 is a longitudinal section through a facing tool, embodying our invention, the section being taken on line 1—1, Fig. 2; Fig. 2 a left hand end view of Fig. 1; Fig. 3 a cross section on line 3—3, Fig. 1; Fig. 4 a side view of the facing tool on a reduced scale; Fig. 5 a longitudinal section on line 5—5, Fig. 2; Fig. 6 a cross section on line 6—6, Fig. 1; Fig. 7 a section on line 7—7, Fig. 6; Fig. 8 a front view of a modified form of the face plate; Fig. 9 a similar view with the drill attached thereto, and Fig. 10 a cross section on line 10—10, Fig. 9.

Our improved facing tool comprises essentially a head 15 provided with a central bore 16 so as to be adapted to be fitted upon a shank or spindle 17 adapted to be inserted into a lathe, boring mill, etc., to which shank it may be secured in suitable manner, the drawing showing a clamp screw 18 provided for this purpose. Head 15 is furnished at its front with a diametrically extending groove or guide way 19 within which a tool holder 20 is slidably mounted. This holder is confined within guide way 19 by means of a disk 21 secured to the head 15 by screws 22. Holder 20 is provided with a transverse square bore 23 extending preferably at an angle to the axis of head 15 and adapted to receive the tool bit 24 which projects outward through a radial slot 25 of disk 21. The tool 24 is held in position by a clamp screw 26, while its beveled rear end 27 is engaged by an adjusting screw 28 that effectively prevents the tool from being pushed inward while at the same time permitting an outward adjustment thereof. The tool holder 20 is of fork-like shape as clearly illustrated in Fig. 3 for the purpose of increasing its length and nevertheless permitting the tool bit to come as close as possible to the center of head 15.

The tool holder 20 is adapted to be moved in a radial direction by means of a feed screw 29 having a left hand square thread and loosely seated within a trough-shaped smooth transverse groove 30 of head 15. The screw 29 protrudes laterally into a threaded segmental recess 31 of holder 20. For preventing an axial displacement of screw 29, the latter is provided with a circumferential groove 32 into which projects the forked end of a retaining plug 33 fitted into a radially extending bore 34 of head 15 and held in position by a screw 35. Screw 29 is provided at one end with a relatively fixed toothed feed wheel 36 received within a socket 37 of head 15. The teeth of wheel 36 are adapted to be engaged by a number of pins 38 that are yieldingly mounted in bores 39 of a ring 40, the drawing showing two of such pins. The ring 40 is loosely mounted on the hub 41 of head 15 and is held in position by a collar 42 firmly driven upon the reduced outer section 43 of said hub. Each pin 38 is provided with a substantially triangular lateral recess 44 that is normally engaged by the likewise triangular nose 45 of a retaining plunger 46 which is loosely mounted within a bore 47 of ring 40, said bore extending at right angles to bore 39. Plunger 46 is normally advanced toward pin 38 by a spring 48 bearing against a screw plug 49. It will be seen that whenever a pin 38 should happen to strike on top of one of the teeth of wheel 36, said pin is able to yield outward against the action of spring 48, thereby preventing a jamming of the head 15 or a possible breakage of some of its parts. One of the pins 38 is provided with a threaded rear end 50 upon which is fitted a nut 51. By properly setting the latter, the corresponding pin 38 may be retracted so that but a single pin 38 engages wheel 36 in case a slow feed of the tool 24 is desired. Ring 40 is provided at its periphery with a number of radially extending sockets 52 into which a suitable rod or another implement (not shown) may be inserted for maintaining said ring at a standstill while the head 15 rotates.

As thus far described it will be seen that upon the rotation of head 15 in the proper direction the teeth of wheel 36 will intermittently engage the pins 38 of the ring 40 that does not participate in the rotation of said head. In this way, said wheel and screw 29 will be intermittently rotated to thereby gradually advance the holder 20 and the tool 24 carried thereby. After the latter has performed its work it may be manually returned to its original position for which purpose screw 29 is provided with a notched axial socket 53 into which a suitable crank (not shown) may be inserted. Head 15 is further provided with means for preventing any vibrations and other undesirable movements thereof whenever the spindle to which said head is attached, is not sufficiently steady as is for instance the case with spindles of boring mills and similar machines. The steadying means of head 15 as shown in Figs. 1, 4 and 5, comprise a circular face plate 54 which is preferably countersunk into disk 21 and is attached to head 15 by screws 55 engaging slots 56 of said plate so as to facilitate a removal thereof. The plate 54 is further provided with a radial slot 57 for accommodating the tool 24. Face plate 54 has an outwardly extending central stud 58 upon which may be removably fitted, by cap screw 59, a thimble or pilot 60 that is snugly received within a corresponding central hole in the surface to be planed. By keeping in stock a plurality of thimbles 60 of different outer diameters, the head 15 may be readily adapted to work pieces having central holes of various diameters. In case the surface to be planed has no such hole, a pilot 61 having a center point 62 is employed as illustrated in Figs. 8, 9 and 10, said pilot being tapped into a face plate 54ª. For providing the necessary central indentation in the surface of the work piece, a flanged bushing 63 carrying a drill 64 may be temporarily slipped over the stud 58ª of face plate 54ª to which plate the bushing-flange may be attached by headed stud 65. In case the spindle carrying the head is of sufficient steadiness to insure a reliable operation of the facing tool bit, the steadying pilots may be removed from the head.

It will be seen that our improved facing tool affords readily operable and effective means for facing the bosses of stationary work pieces and performing similar work. In operation, the facing tool of the rotating head 15 is fed by gripping the ring 40 with the hand or by causing a pin inserted into one of its radial peripheral sockets to bear against part of the machine frame. In this way the screw 29 is operated to gradually feed the tool radially across the face to be planed.

We claim:

1. A self-feeding facing tool comprising a rotary head provided with a radially extending guideway, a forked tool holder slidable in said guideway, a feed screw carried by the head and engaging a threaded segmental recess in one fork of said tool holder for advancing the same, and means carried by the head for rotating said feed screw.

2. A self-feeding facing tool comprising a rotary head provided with a radially extending guide way, a forked tool holder engaging said guide way and provided with a threaded segmental recess in one fork, a feed screw loosely mounted in the head and engaging the tool holder-recess, means for preventing an axial displacement of the feed screw, and means for intermittently rotating the feed screw.

3. A self-feeding facing tool comprising a rotary head provided with a radially extending guide way, a forked tool holder engaging said guide way and provided with a threaded segmental recess, means for confining said holder within said recess, a circumferentially grooved feed screw loosely mounted in the head and engaging the tool holder recess, a forked plug carried by the head and engaging the feed screw-groove for preventing an axial displacement thereof, and means for intermittently rotating said feed screw.

4. A self-feeding facing tool comprising a rotary head provided with a radially extending guide way, a forked tool holder engaging said guide way and provided with a threaded segmental recess and a transverse square hole, a tool adapted to be fitted into said hole and having a beveled rear end, an adjusting screw engaging said end, a feed screw loosely mounted in the head and engaging the tool holder-recess, means for preventing an axial displacement of the feed screw, and means for intermittently rotating said feed screw.

5. A self-feeding facing tool comprising a rotary head provided with a radially extending guide way, a tool holder slidable in said guide way, a tool adjustably mounted within said holder, a disk secured to the head for confining the holder within the guide way and provided with a radial slot for accommodating the tool, a feed screw loosely rotatable within the head and engaging the tool holder, and means for rotating said screw.

6. A self-feeding facing tool comprising a rotary head provided with a radially extending guideway, a tool holder engaging said guideway and provided with a threaded recess and a transverse angular hole, a disk fixed to said head and acting to confine said holder within said guideway, a tool adapted to be fitted into said hole and to project through a radial slot in said disk, a feed screw rotatable in said head and engaging the tool holder, and means carried by the head for rotating said feed screw.

7. A self-feeding facing tool comprising a rotary head provided with a radially extending guide way, a tool holder slidable in said guide way, a tool adjustably mounted within said holder, a disk secured to the head for confining the holder within the guide way and provided with a radial slot for accommodating the tool, a feed screw loosely rotatable within the head and engaging the tool holder, means for rotating said screw, a face plate removably secured to the disk, and a pilot on said face plate.

8. A self-feeding facing tool comprising a rotary head provided with a radially extending guide way, a tool holder slidable in said guide way, means for confining said holder within said guide way, a feed screw loosely rotatable within the head and engaging the tool holder, a toothed wheel fast on said screw, a stationary perforated ring carried by the head, a pin slidably fitted into the ring-perforation and adapted to engage the toothed wheel, and a spring-influenced plunger laterally engaging the pin and maintaining the same in a protruding position.

9. A self-feeding facing tool comprising a rotary head provided with a radially extending guide way, a tool holder slidable in said guide way, means for confining said holder within said guide way, a feed screw loosely rotatable within the head and engaging the tool holder, a toothed wheel fast on said screw, a stationary perforated ring carried by the head, a recessed pin slidably fitted into the ring-perforation and adapted to engage the toothed wheel, a spring-influenced plunger arranged at right angles to the pin, and a tapering nose on said plunger adapted to engage the pin-recess.

10. A self-feeding facing tool comprising a rotary head provided with a radially extending guide way, a forked tool holder engaging said guide way and provided with a threaded segmental recess, means for confining said holder within said guide way, a circumferentially grooved feed screw loosely mounted in the head and engaging the tool holder-recess, a forked plug carried by the head and engaging the feed screw-groove for preventing an axial displacement thereof, a toothed wheel fast on the feed screw, a stationary ring carried by the head and provided with a pair of axial perforations, a pair of yielding pins slidably fitted into said perforations and adapted to engage the toothed wheel, and means for retracting one of said pins.

ERVIN S. MUMMERT.
JOSEPH O. DIXON.

Copies of this patent may be obtained for five cents each, by addressing the "Commissioner of Patents, Washington, D. C."